Feb. 1, 1955

H. S. BULFER 2,700,858

EAR AGITATING AND CONTROLLING MEANS
FOR CORN HARVESTING ROLLS

Filed Oct. 18, 1954

INVENTOR
HAYES S. BULFER.

BY *Louis L. Ansart*

ATTORNEY

INVENTOR
HAYES S. BULFER.
BY
ATTORNEY

United States Patent Office 2,700,858
Patented Feb. 1, 1955

2,700,858

EAR AGITATING AND CONTROLLING MEANS FOR CORN HARVESTING ROLLS

Hayes S. Bulfer, Garden City, Minn.

Application October 18, 1954, Serial No. 462,667

9 Claims. (Cl. 56—18)

The present invention relates to improvements in corn harvesters and is a continuation-in-part of my application No. 249,160, now abandoned, and more particularly to improvements in combined picking and husking machines of a type intended for mounting or assembly on a propelling tractor. The improvements of the present invention are particularly applicable to machines of this character produced by the Allis-Chalmers Manufacturing Company.

When a tractor-propelled machine of this character is put into use, the stalks of each row of corn on which it operates are engaged by a pair of rolls having picker sections which pick or snap the ears of corn from the stalks as the stalks are brought down in the direction of movement of the machine and carried down beneath said picking rolls. The picked ears pass rearwardly from the picker roll sections to husking roll sections which are on the same shaft as the picking roll sections.

However, prior machines have no means for agitating the picked ears and keeping them moving rearwardly over the husking rolls. As a result there is a lot of plugging or jamming of ears over the husking roll sections. This difficulty is particularly troublesome under dry or frozen conditions of the ears, and in fact harvesting by the machine is rendered practically impossible.

Such plugging or jamming must be broken up and cleaned out. This requires a good deal of time and is very dangerous when performed during operation of the machine.

An important object of the invention is to provide novel and advantageous means for overcoming such difficulties.

Another object of the invention is to provide means for agitating the ears and keeping them moving over the husking roll sections.

Still another object is to provide means for beating the ears down on the husking roll sections to assure effective husking.

A further object is to provide means for forcing the ears downwardly into engagement with the husking roll sections and also advancing them along the husking roll sections.

According to a preferred embodiment of the invention, the corn harvester is designed to act on two rows of stalks at the same time, and the beating down of the ears on the two corresponding sets of husking roll sections and advancing of the ears along these sections is effected by a device extending transversely over both sets of husking rolls. This device comprises a transverse shaft extending across the machine above the two sets of husking roll sections and driven from a suitable part of the main machine with which it is operatively connected, and two beating and advancing devices on said shaft over the two sets of husking roll sections. Preferably each of said beating and advancing devices comprises radial blades or paddles each of which has a flexible edge. The blades proper may be of metal and the flexible edges of sufficient weight and stiffness to produce a beating effect, for example pieces of canvas driving belts.

Of course the invention may be applied to a corn harvester acting only on one row of stalks at a time.

Other objects, features and advantages will appear upon consideration of the following detailed description and of the drawings in which.

Figure 1:
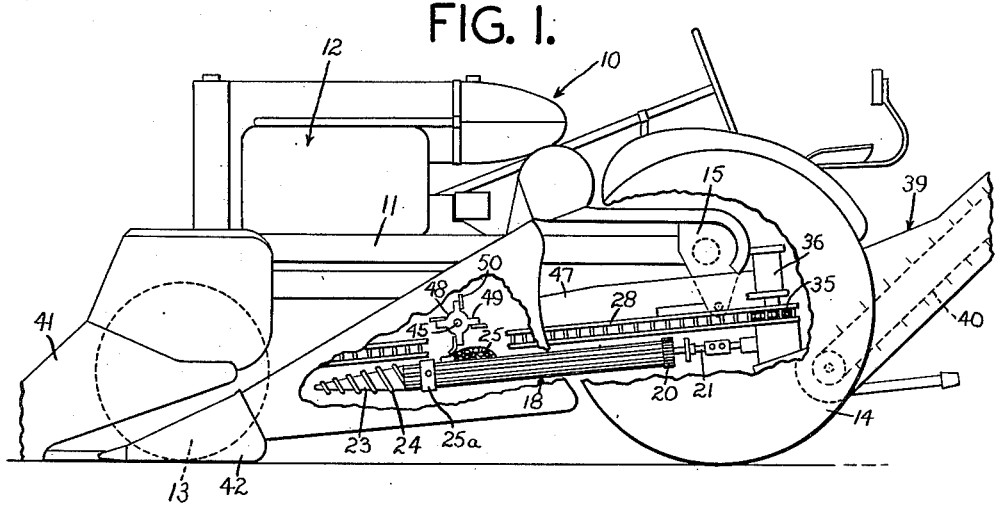
Fig. 1 is a side elevation of a corn harvester equipped with one embodiment of the present invention, parts being broken away to show the underlying structure.

The drawings illustrate an embodiment of the invention applied to a corn harvester which comprises a conventional form of farm tractor 10 having a supporting frame with laterally spaced side bars 11 carrying an engine 12 with its radiator and other accessories. The front end of the tractor frame is supported on one or more steerable wheels 13 whose axles are suitably hung from the frame, and the rear end of the frame is supported on traction wheels 14 whose axles are mounted in a rear axle housing 15 which supports the rear ends of frame bars 11.

The corn harvester is illustrated as comprising two similar picker and husking units 16 and 17, (Fig. 3), each comprising a set of two picking and husking rolls 18 and 19. The rolls 18 and 19 of each set are connected for rotation in opposite directions by intermeshing gears 20 at the rear ends of shafts 21. One shaft 21 of each set extends rearwardly from the gear 20 of the roll 19 of each of said sets to a gear box 22 (Fig. 2) containing mechanism whereby said shafts 21 are driven in opposite directions. The means for driving said shafts 21 may be of the same general character as that disclosed in the patent to Scranton 2,340,084, January 25, 1944.

Each of said rolls 18 and 19 has a forward conical picker section 23 of suitable metal provided with a screw thread 24 and the screw threads on the adjacent rolls 18 and 19 are wound in opposite directions to pick or snap ears 25 from stalks passing between and downwardly therethrough. In this picking action the ears 25 on each row of stalks are advanced over outer and inner stripper plates 26 and 27 by means of a gathering chain 28 having projecting flights 29 to engage the butt ends of the picked ears. As the ears of each row pass over said stripper plates, the stalks are forced down through an opening or slot between the stripper plates.

From the picker sections 23 the ears 25 pass over bearing brackets 25a to and along husking sections of said rolls 18 and 19. These sections have longitudinal flutes or corrugations, section 30 on roll 19 being of metal such as iron or steel and section 31 of roll 18 having a body of resilient material such as rubber mounted on a suitable shaft 32. Metal section 30 has longitudinal flutes 33 and rubber section 31 has corresponding longitudinal flutes 34. Each flute of one section enters a space between two flutes of the other section as the sections revolve in opposite directions to draw the husks downwardly therebetween as the ears 25 are normally advanced therealong by the corresponding gathering chain 28.

Figure 2:
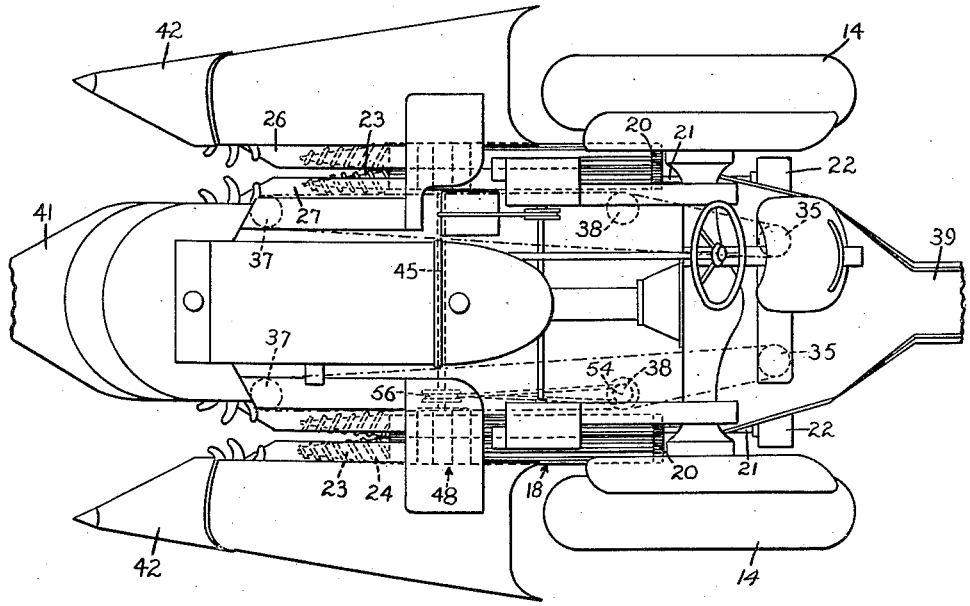
Fig. 2 is a top plan view of the machine illustrated in Fig. 1.
Figure 3:
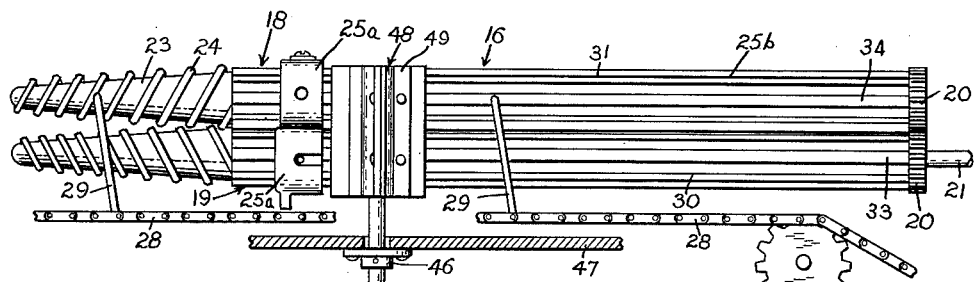
Fig. 3 is a fragmentary sectional view illustrating the preferred embodiment of the present invention on a larger scale than Figs. 1 and 2.

Each gathering chain 28 is driven by a sprocket wheel 35 (Fig. 1) connected by a yieldable clutch 36 to a shaft projecting from the gear box 22 (Fig. 2). From the inner side of sprocket wheel 35, the chain 28 extends to and around a sprocket wheel 37 (Fig. 2) from which it passes in the opposite direction along the path of the ears to the outer side of a sprocket wheel 38. From the sprocket wheel 38, the chain 28 passes with an inward inclination to the outer side of sprocket wheel 35. From the chain 28 the ears fall into a conveyor 39 having a flighted belt 40.

The rows of corn stalks are positioned for feeding to the two sets of picking and husking rolls by a central divider shield 41 mounted on the forward end of the tractor and outer or gathering shields 42.

The foregoing detailed description applies to machines heretofore in use which in general have proved satisfactory. Under certain conditions, however, the husks are not gripped between the husking rolls and the ears are not held down thereby, resulting in ears riding above the flights 29 of the corresponding gathering chain 28.

This is particularly true when the ears are very dry or cold. The machine is then jammed or plugged at this point and the ears are not advanced. This condition must be eliminated before satisfactory operation can be restored. Manual breaking up of this jamming or plugging is difficult and time-consuming, and is very dangerous during operation of the machine.

Figure 4:
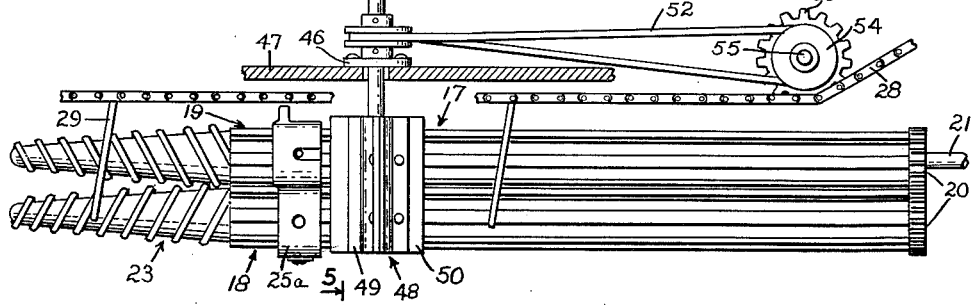
Fig. 4 is a side elevation of the structure as seen from below in Fig. 3.
Figure 6:
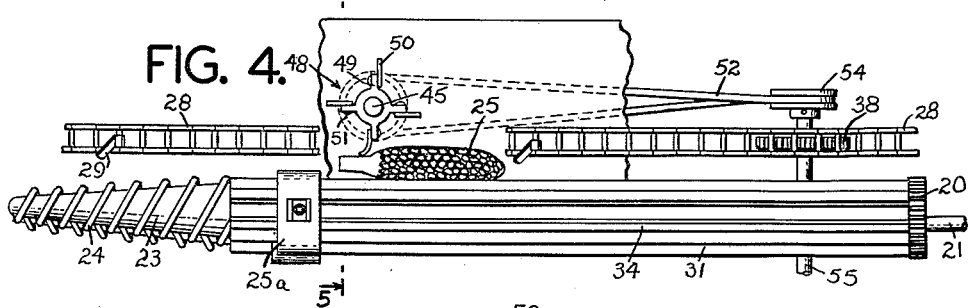
Fig. 6 is a modified form of the beater illustrated in Fig. 5.

The present invention relates to the provision of means to prevent such jamming of the ears and plugging of the machine. To this end provision is made of means for agitating the ears over the entrance ends of the husking sections 30 and 31 and beating them down into suitable engagement with said husking sections (Fig. 4).

According to an approved manner of carrying out the invention provision is made of a transverse shaft 45 extending over the forward ends of the husking roll-sections at opposite sides of the machine. Said shaft 45 is mounted in bearings 46, carried by plates 47 at the inner sides of said sets of rolls 18 and 19. Fixed on said shaft 45 over each set of rolls 18 and 19 is a hub or spider 48 having substantially radial blades 49, the arrangement being such that the outer edges of the blades 49 of either one of these hubs will not strike an ear 25 in position for engagement of its husk by the corresponding husking roll sections 30 and 31 beneath the same, and will not strike the flights 29 on the corresponding gathering chain 28.

Figure 5:
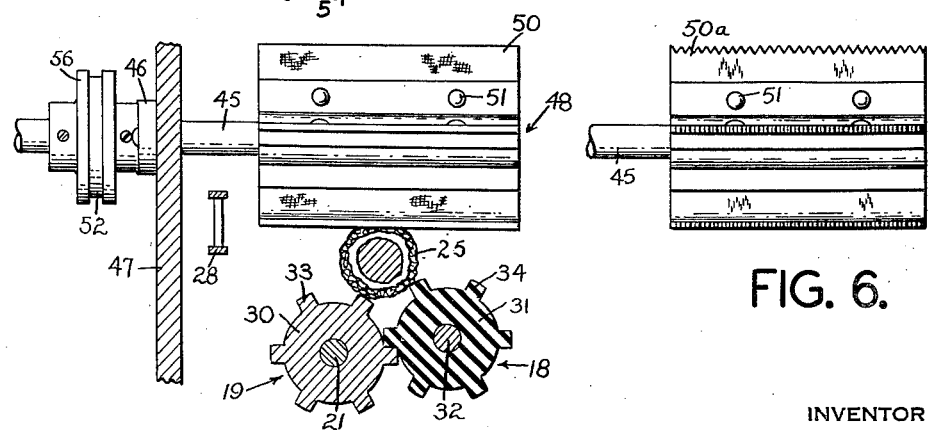
Fig. 5 is an enlarged sectional view taken along the line 5—5 of Fig. 4.

To avoid unnecessary injury to the ears of corn, the blades 49 are provided with flexible edges which may be of different forms but as illustrated in Figs. 1–5, are made of pieces of flexible cotton fabric ordinarily used for machine belts. This fabric is sufficiently stiff and heavy to produce effective agitation and beating down. Such flexible edges or flaps 50 may be secured to said blades 49 by suitable means such as rivets 51 (Fig. 5). The shaft 45 is rotated in a direction to urge the ears rearwardly as well as agitate and beat them down.

The driving of said shaft 45 is in counter-clockwise direction and is effected by means of a belt 52 (Figs. 3 and 4) connecting a pulley 54 on shaft 55 carrying one of the sprocket wheels 38, with a pulley 56 fixed on shaft 45 at a position corresponding to that of said sprocket wheel 38. Inasmuch as shaft 55 is substantially vertical and shaft 45 is substantially horizontal, the loop of belt 52 must be given a quarter twist.

The operation of the disclosed form of corn picking and husking harvester which acts on two rows of stalks at a time, will now be described briefly. The machine is driven over two rows of corn so that the central divider shield 41 passes between the two rows and the two outer or gathering shields 42 pass outside of the corresponding rows. The stalks of each row pass between the corresponding picker rolls 23 and between the corresponding stripper plates 26 and 27. The stalks are bent forwardly and forced downwardly between the picker rolls and the ears 25 are snapped therefrom and carried to and along the husking roll sections 30 and 31 by the flights 29 of the gathering chains 28.

As shown in Fig. 4 the portion of each flight 29 which engages the trailing end of an ear is positioned to engage the trailing end of an ear in position to be husked. The positioning of the ears is not so important over the picking rolls during the feeding of the ears to the husking section. When, however, the ears reach the husking zone, each ear must be close to the husking sections of the rolls and be fed regularly along the same.

When the ears are too dry or frozen, for example, they are likely to jam or plug the machine over the husking roll sections. Such jamming or plugging is avoided by the rotary beating and feeding devices on shaft 45, the flaps 50 of which beat the ears down as they enter the husking zone and not only place the ears over the husking roll sections so that the husk material will be stripped from the ear proper, but assist in moving the husked ears along the husking roll sections.

From the husking zone the husked ears are fed to the conveyor belt 40 which discharges them into a receptacle such as the box of a wagon pulled by the tractor.

While the use of said flaps 50 has given good result, it has been found that more severe treatment is frequently desirable and that sawtoothed flexible metal strips 50a produce exceptionally good results.

It is evident that the improvements of the present invention enable satisfactory operation of the harvester under practically all conditions likely to be encountered.

It should be understood that various changes can be made and that certain features can be used without others, without departing from the true scope and spirit of the invention.

What is claimed is:

1. In a tractor-operated corn harvester, the combination of cooperating harvester rolls arranged side-by-side and comprising a pair of cooperating ear-picking roll sections and a following pair of husking roll sections to support and husk picked ears fed thereto, means including a conveying chain with flights for collecting stalks and directing them between said ear-picking rolls and for moving picked ears along said pair of husking roll sections lengthwise thereof, ear-agitating means over the entrance end of said husking roll sections for depressing and advancing the ears passing beneath the same to effect engagement of said ears with said husking roll sections and to position said ears for engagement by the flights of said chain, and driving means for operating said sets of harvester rolls, said conveying chain and said agitating means.

2. The combination of claim 1 wherein said ear-agitating means comprises a driven shaft having at least one ear-engaging blade.

3. The combination according to claim 2 wherein the blade has a flexible edge portion.

4. The combination according to claim 3 wherein said flexible edge portion comprises a strip of canvas belting.

5. The combination according to claim 3 wherein said flexible edge portion comprises a metal strip with a sawtooth edge.

6. The combination according to claim 1 wherein said husking roll sections are longitudinally fluted.

7. A device as in claim 6 wherein one of the roll sections consists of rubber.

8. The combination according to claim 1 wherein said means for agitating the ears comprises a horizontal shaft, a pulley on said shaft, a vertical shaft at the discharge end of said roll section, a guiding sprocket for said gathering chain on said vertical shaft, a pulley on said vertical shaft, and a driving belt over said pulleys and having a 90° twist.

9. The combination according to claim 1 wherein one of each pair of husking roll sections has a rubber surface.

No references cited.